United States Patent [19]

Fuse

[11] Patent Number: 5,229,761

[45] Date of Patent: Jul. 20, 1993

[54] VOLTAGE GENERATING CIRCUIT FOR DRIVING LIQUID CRYSTAL DISPLAY DEVICE

[75] Inventor: Takahiro Fuse, Akigawa, Japan

[73] Assignee: Casio Computer Co., Ltd., Tokyo, Japan

[21] Appl. No.: 632,059

[22] Filed: Dec. 21, 1990

[30] Foreign Application Priority Data

Dec. 28, 1989 [JP] Japan .................. 1-343609
Nov. 29, 1990 [JP] Japan .................. 2-333114

[51] Int. Cl.⁵ ............................................. G09G 3/36
[52] U.S. Cl. ................................. 340/784; 340/811; 359/55
[58] Field of Search ............... 340/811, 805, 784 CL, 340/784 DL, 784 E, 784 F, 784 J; 359/55; 307/262, 264, 268

[56] References Cited

U.S. PATENT DOCUMENTS

| | | | |
|---|---|---|---|
| 3,955,353 | 5/1976 | Astle | 58/23 BA |
| 4,168,498 | 9/1979 | Kubota et al. | 340/811 |
| 4,769,639 | 9/1988 | Kawamura et al. | 340/811 |
| 4,860,311 | 8/1989 | Storberg | 307/262 |
| 4,866,297 | 9/1989 | Matsumoto | 307/262 |
| 4,929,848 | 5/1990 | Gulczynski | 307/296.1 |
| 4,965,566 | 10/1990 | Kawamura et al. | 340/784 |

*Primary Examiner*—Ulysses Weldon
*Assistant Examiner*—Matthew Luu
*Attorney, Agent, or Firm*—Frishauf, Holtz, Goodman & Woodward

[57] ABSTRACT

A voltage generating circuit generates voltages of various voltage levels for driving a liquid crystal display device. A first voltage source generates first voltage for driving a liquid crystal device while there is provided a first switched capacitor circuit which inverts the first voltage in polarity to generate second voltage for driving a liquid crystal display device, and a second voltage source generates third voltage for driving the display device while there is provided a second switched capacitor circuit which inverts the third voltage in polarity to generate fourth voltage for driving the display device. Further, the first switched capacitor circuit is integrated together with a liquid-crystal driving circuit which selectively outputs the first and second liquid crystal driving voltage while the second switched capacitor circuit is integrated together with a liquid crystal driving circuit which selectively outputs the third and fourth liquid-crystal driving voltage.

8 Claims, 9 Drawing Sheets

VOLTAGE GENERATING CIRCUIT FOR DRIVING LIQUID CRYSTAL DISPLAY DEVICE

BACKGROUND OF THE INVENTION

1. Field of the Invention

The present invention relates to a voltage generating circuit for generating voltages of various voltage levels for driving liquid crystal display devices used in a liquid crystal display television receiver and the like.

2. Description of the Prior Art

Voltages of various voltage levels are needed to drive a liquid crystal display device used in a liquid crystal display television receiver and the like. An example of a voltage generating circuit for generating voltages of various voltage levels is disclosed in U.S. Pat. No. 4,769,639, which has a construction as shown in FIG. 1.

In FIG. 1, a reference E denotes a DC power source. A terminal (−) of the DC power source E is directly grounded while its terminal (+) is grounded through a series connection of a variable resistor R1 and a resistor R2. A divided voltage at a junction point of the variable resistor R1 and the resistor R2 is supplied to a terminal (+) of a differential amplifier circuit A1. A terminal (−) of the differential amplifier A1 is grounded through a resistor Ra. The differential amplifier A1 serves as an amplifier of a non inversion type with a feed back resistor Rb connected between its output terminal and the terminal (−), the voltage gain of which is given by the feed back resistance Rb and the resistance Ra. An output signal of the differential amplifier A1 is used as a driving voltage V1 for driving liquid crystals and is supplied to a terminal (−) of a differential amplifier A2 through a resistor Rc. The differential amplifier A2 has a terminal (+) which is grounded directly and the terminal (−) which is connected through a feed back resistor Rd to its output terminal. The differential amplifier A2 is an amplifier of an inversion type, too and its voltage gain is determined by the resistances Rc, Rd. The output of the differential amplifier A2 is used as a driving voltage V5 for driving liquid crystals.

Meanwhile, the output terminal of the differential amplifier A1 is grounded through a series connection of a resistor R3 and a resistor R4. A voltage at a junction point of the resistor R3 and the resistor R4 is supplied to a terminal (+) of a differential amplifier A3. The differential amplifier A3 is a voltage follower of a non inversion type with its output signal applied to its terminal (−) as a feed back voltage. The output of the differential amplifier A3 is used as a driving voltage V2 for driving liquid crystals.

The output signal of the differential amplifier A3 is supplied to a terminal (−) of a differential amplifier A4 through a resistor Re. The differential amplifier A4 has a terminal (+) grounded directly and the terminal (−) connected through a feed back resistor Rf to its output terminal. The differential amplifier A4 is an amplifier of an inversion type, too and its voltage gain is determined by the resistances Re, Rf. The output of the differential amplifier A4 is used as a driving voltage V4 for driving liquid crystals.

To drive the above circuit, a positive power source E+ and a negative power source E− (not shown) are supplied to the differential amplifiers A1, A2, A3 and A4 under conditions that " the positive power source E+ is higher than the output voltage V1 and the negative power source E− is less than the output voltage V5.

Now, operation of the above prior art circuit will be described. The DC power voltage E is divided by the variable resistor R1 and the resister R2 and the divided voltage is supplied to the differential amplifier A1 as a reference voltage, which can be set to any voltage level by changing the variable resistance R1. The differential amplifier A1 amplifies the above reference voltage in the same polarity with the voltage gain determined by the resistances Ra and Rb, and supplies it to the next differential amplifier A2 through the resistor Rc. The amplified voltage is used as the driving voltage V1 for driving liquid crystals. The differential amplifier A2 amplifies the input voltage in the opposite polarity with the voltage gain determined by the resistances Rc and Rd. The amplified voltage is used as the driving voltage V5 for driving liquid crystals. Accordingly, the driving voltage V5 has the same voltage level as the driving voltage V1 with respect to the earth potential (=V3) but in the opposite polarity.

The output voltage of the differential amplifier A1 is divided by the resistors R3 and R4, and the divided voltage is supplied to the differential amplifier A3. The differential amplifier A3 outputs a voltage as the driving voltage V2 in the same polarity as that of the input voltage and supplies it through the resistor Re to the differential amplifier A4. The differential amplifier A4 inverts the input voltage in polarity and amplifies it with the voltage gain determined based on the resistances Re and Rf, and then outputs the amplified voltage as the driving voltage V4. The driving voltage V4 for driving liquid crystals has the same voltage level as the driving voltage V2 with respect to the earth potential (=V3) but in the opposite polarity.

The driving voltages V1, V2, V4 and V5 are obtained as described above, but their voltage levels have to be adjusted so as to meet conditions that "V1=−V5" and "V2 =−V4", as shown in FIG. 2. The differential amplifiers A2, A4 are amplifiers of a inversion type with unit voltage gain. Therefor, the resistances Rc, Rd, Re and Rf are set so as to meet conditions that "Rc=Rd" and "Re=Rf". More specifically, the amplifier A2 outputs the driving voltage V5 having the same voltage level as the driving voltage V1 but in the opposite polarity and the amplifier A4 outputs the driving voltage V4 having the same voltage level as the driving voltage V2 in the opposite polarity. Since the driving voltage V1 is applied to the differential amplifier A2" and further a voltage obtained by multiplying the driving voltage V1 by ratio of resistance R3 to total resistance R3+R4 is applied to the differential amplifier V2, all the driving voltages V2, V4 and V5 are dependent on the driving voltage V1.

The driving voltage V1 varies in accordance with variation in the reference voltage. All the driving voltages V1, V2, V4 and V5 can be simultaneously changed by changing the reference voltage by means of the resistor R1. In the circuit as described above, driving voltages V1, V2, V4 and V5 are previously set to the best ratio and these voltages are adjusted by changing the variable resistance R1 with the above ratio maintained unchanged.

The above voltage generating circuit, however, has the following drawbacks: (a) the amplifier needs both a positive power source and a negative power source; (b) four units of differential amplifiers are needed, resulting in a complicated circuit configuration, and (c) five connecting lines are needed to connect the voltage generating circuits to driving circuits for driving liquid crystals. Since the connecting lines for the driving voltages V1, V2, V3, V4 and V5 are needed, it is very hard to make the whole liquid crystal display device compact in size which includes a power source circuit section, a voltage generating circuit section for generating liquid-crystal driving voltages, liquid-crystal driving circuit section and a control circuit section.

The present invention has been made to remove the above drawbacks and has an object to provide a voltage generating circuit for generating a liquid-crystal driving voltage, which circuit needs only one of a positive power source circuit and a negative power source circuit to generate voltages of various levels such as V1, V2, V3, V4 and V5 for driving liquid crystals and can be realized with a simple circuit construction, resulting in compact in size.

SUMMARY OF THE INVENTION

According to the invention, a voltage generating circuit for generating voltages to drive a liquid crystal display device comprises:

a first integrated circuit;

a second integrated circuit;

a first voltage source circuit externally connected to said first integrated circuit for supplying a first voltage for driving said liquid crystal display device;

a first switched capacitor circuit involved in said first integrated circuit for inverting the first voltage to obtain a second voltage for driving said liquid crystal display device;

a second voltage source circuit externally connected to said second integrated circuit for supplying a third voltage for driving said liquid crystal display device;

and a second switched capacitor circuit involved in said second integrated circuit for inverting the third voltage to obtain a fourth voltage for driving the liquid crystal display device.

Features of the voltage generating circuit according to the present invention reside in that the first voltage source generates the first voltage for driving a liquid crystal device while there is provided the first switched capacitor circuit which inverts the first voltage in polarity to generate the second voltage for driving a liquid crystal display device, and the second voltage source generates third voltage for driving the liquid crystal display device while there is provided the second switched capacitor circuit which inverts the third voltage in polarity to generate the fourth voltage for driving the liquid crystal display device.

The above described construction of the voltage generating circuit allows the first switched capacitor circuit to invert in porality the first liquid-crystal driving voltage outputted from the first voltage source to produce the second liquid-crystal driving voltage and further allows the second switched capacitor circuit to invert in polarity the third liquid-crystal driving voltage outputted from the second voltage source to produce fourth liquid-crystal driving voltage. As described above, the first and second switched capacitor circuit generate the liquid crystal driving voltages by inverting in polarity the first and third driving voltage. Therefor, a usage of only one of the positive and negative power source allows generation of the first through fourth liquid-crystal driving voltage. Further, the above construction of the voltage generating circuit can be realized simply in circuit configuration with less number of amplifiers.

Furthermore, features of the present invention resides in that the first switched capacitor circuit is integrated together with a liquid-crystal driving circuit which selectively outputs the first and second liquid-crystal driving voltage while the second switched capacitor circuit is integrated together with a liquid-crystal driving circuit which selectively outputs the third and fourth liquid-crystal driving voltage.

Integrated circuit involving the switched capacitor circuit and the liquid-crystal driving circuit allows the circuit to be made compact in size and the integrated circuit shows a great effect for being conveniently used in a small sized liquid crystal display device.

In addition, in the voltage generating circuit according to the present invention, a signal electrode driving circuit involves the first switched capacitor circuit that inverts the polarity of a first signal electrode driving voltage to output a second signal electrode driving voltage while the first voltage source outputs the first signal electrode driving voltage, and the signal electrode driving circuit that inverts the polarity of a first scanning electrode driving voltage to output a second scanning electrode driving voltage while the second voltage source outputs the first scanning electrode driving voltage. The above first and second switched capacitor circuit can be integrated into a small sized circuit block together with the signal electrode driving circuit and the scanning electrode driving circuit.

DESCRIPTION OF THE EMBODIMENT

A liquid crystal display television receiver employing an embodiment of the invention will be described with reference to the drawings.

Figure 1:
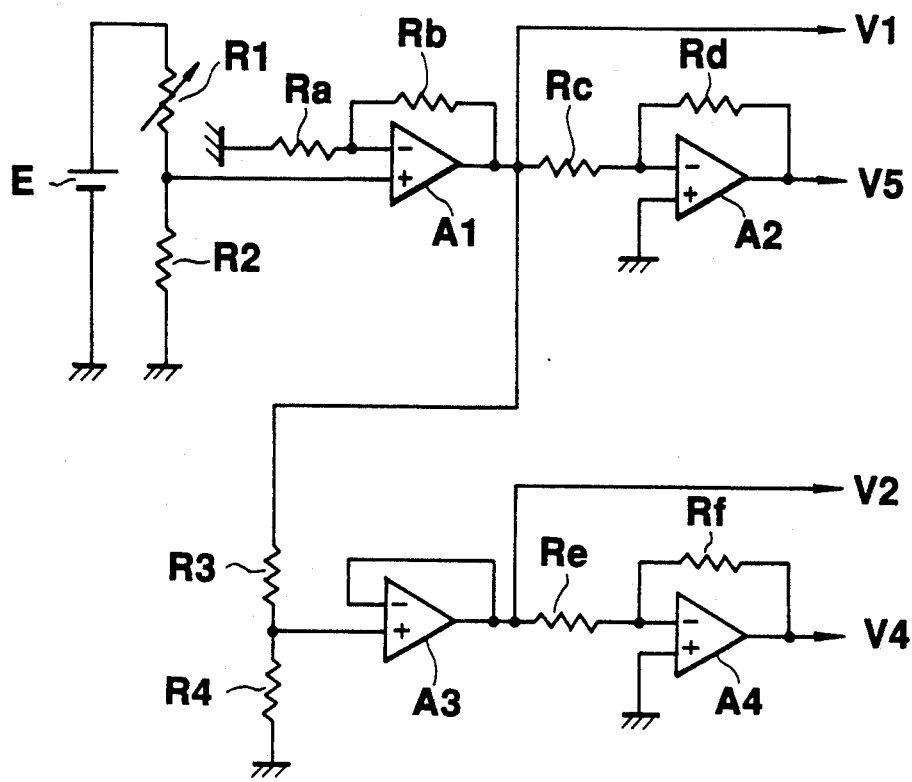
FIG. 1 is a circuit diagram of a voltage generating circuit (prior art)
Figure 2:
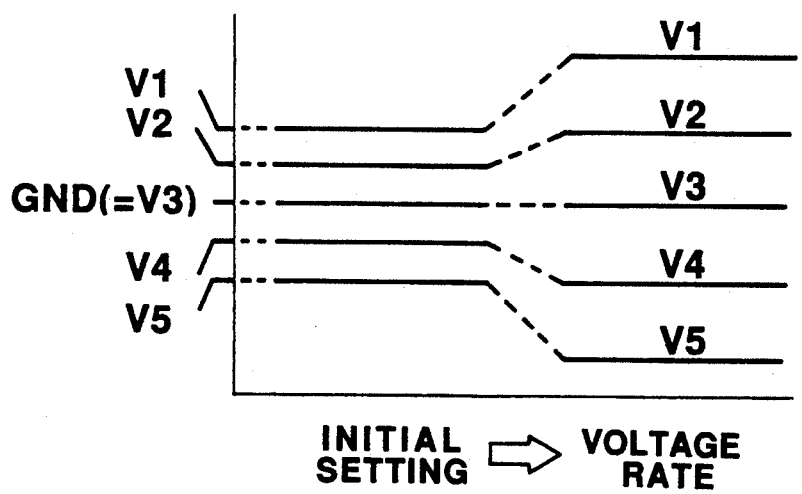
FIG. 2 is a view showing a relationship between driving voltages (prior art)
Figure 3:
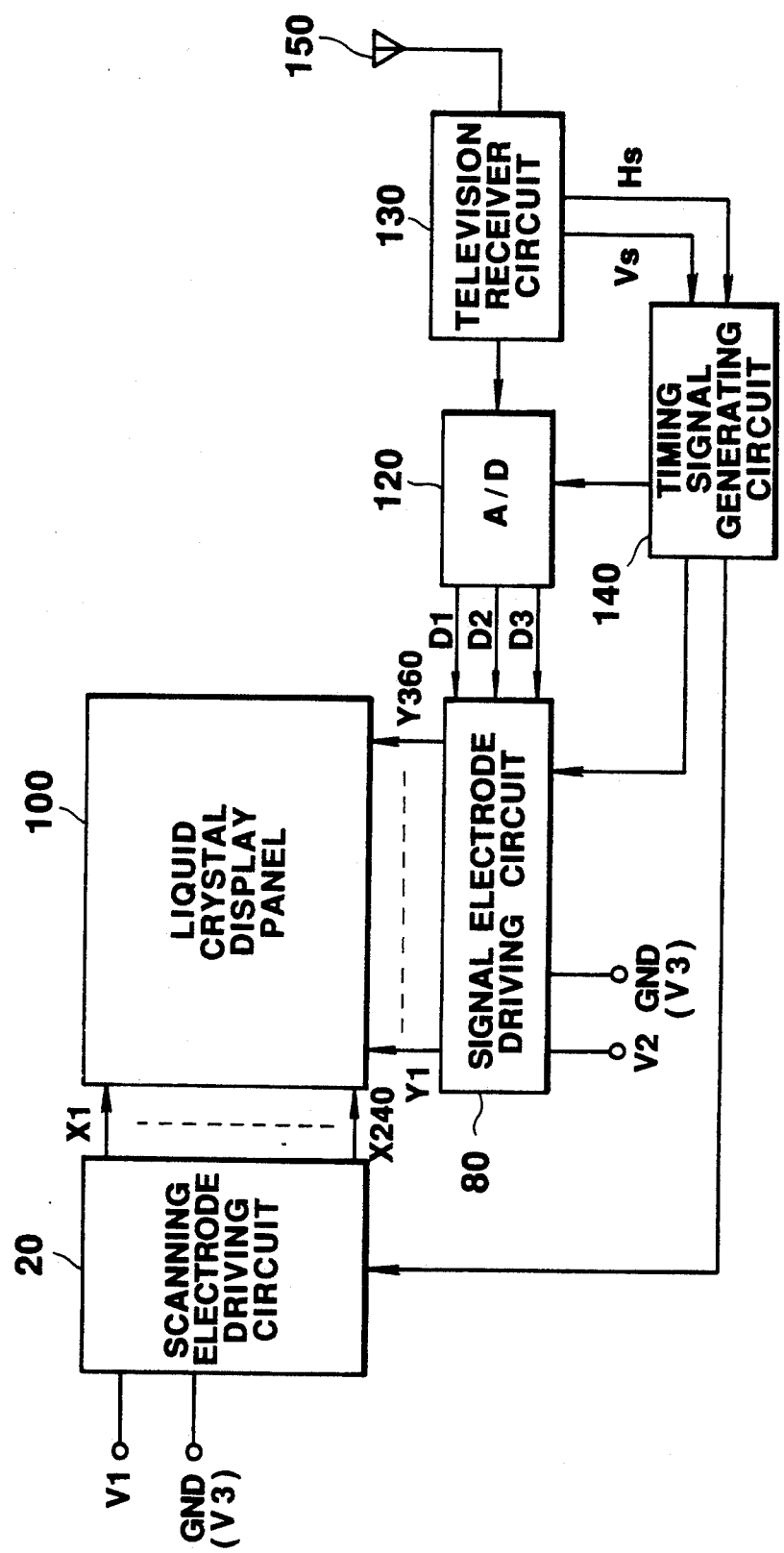
FIG. 3 is a block diagram showing a whole circuit construction of an embodiment of the present invention.

FIG. 3 is a view showing a whole circuit construction of the liquid crystal display television receiver. An electric television broadcasting wave received by an antenna 150 is input to a television receiver circuit 130. The television receiver circuit 130 detects an analog video signal, a vertical sync pulse signal Vs and a horizontal sync pulse signal Hs from the received television signal. The television receiver circuit 130 outputs the analog video signal to an analog/digital converter (A/D converter) 120 and outputs the vertical sync pulse signal Vs and horizontal sync pulse signal Hs to a timing signal generating circuit 140. The timing signal generating circuit 140 generates various timing signals based on the received vertical sync pulse signal Vs and horizontal sync pulse signal Hs and supplies them to A/D converter 120, a signal electrode driving circuit 80 and a scanning electrode driving circuit 20. A/D converter 120 converts the received video signal into digital signals D1, D2 and D3 of, for example, three bit gradations based on the timing signal supplied from the timing signal generating circuit 140 and supplies the digital signals D1, D2 and D3 to the signal electrode driving circuit 80. The signal electrode driving circuit 80 generates a voltage V4 (V4<GND, |V4|=|V2|) based on the voltages V2 (V2<GND) and V3 (=GND) applied thereto and drives signal electrodes Y1 through Y360 of a liquid crystal display panel 100 with these voltages or driving voltages V2, V3 and V4. The scanning electrode driving circuit 20 generates a voltage V5 (V5<V4<GND, |V5|=|V1|) based on the voltages V1 (V1>V2>GND) and V3 (=GND) applied thereto and successively drives scanning electrodes X1 through X240 of the liquid crystal display panel 100 with these voltages, i.e., driving voltages V1, V3 and V5.

Now, operation of the voltage generating circuit involved in the signal electrode driving circuit 80 and the scanning electrode driving circuit 20 will be described with reference to FIG. 4.

Figure 4:
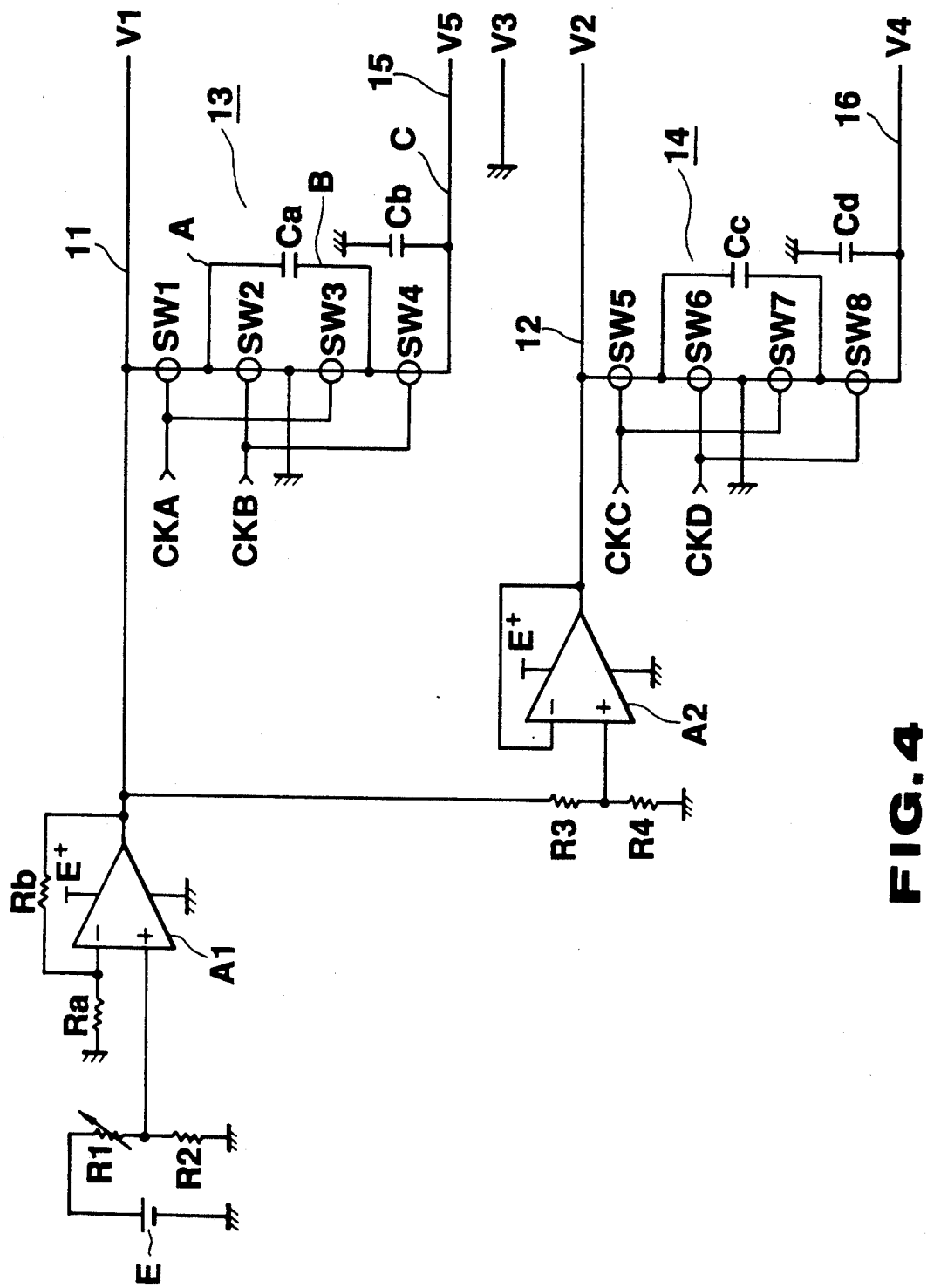
FIG. 4 is a view showing a voltage generating circuit according to the invention.

In FIG. 4, a symbol E denotes DC power source. A terminal (−) of the power source E is grounded and its terminal (+) is grounded through a series connection of a variable resistor R1 and a resistor R2. A divided voltage at a junction point of the variable resister R1 and resister R2 is applied to a terminal (+) of a differential amplifier A1. The differential amplifier A1 is of a non inversion type, a terminal (−) which is grounded through a resistor Ra and further connected to its output terminal through a feed back resistor Rb. The voltage gain of the differential amplifier A1 is determined by the values of the resistors Ra and Rb.

An output signal of the differential amplifier A1 is supplied through an output line 11 to a relevant circuit (not shown) as a liquid-crystal driving voltage V1. The output terminal of the differential amplifier A1 is grounded through a series connection of resistors R3 and R4. A voltage at a junction point of the resistors R3 and R4 is applied to a terminal (+) of a differential amplifier A2. The differential amplifier A2 with its output terminal directly connected to its terminal (−) is a voltage follower of an inversion type. An output signal of the differential amplifier A2 is supplied through an output line 12 to a relevant circuit (not shown) as a liquid-crystal driving voltage V2. A positive power source E+ is supplied to both the differential amplifiers A1 and A2 under conditions that "E+ > V1".

The output line 11 of the liquid-crystal driving voltage V1 is connected to an output line 15 through a first switched capacitor circuit 13. The first switched capacitor circuit 13 comprises analog switches SW1, SW2, SW3 and SW4, and capacitors Ca and Cb. A series connection of the analog switches SW1, SW2, SW3 and SW4 is connected between the output line 11 and the output line 15 and a junction point of the analog switches SW2 and SW3 is grounded. A capacitor Ca is connected to a series connection of the analog switches SW2 and SW3 in parallel and a capacitor Cb is connected between the output line 15 and the earth. The analog switches SW1 and SW3 are controlled by a clock pulse signal CKA so as to be made open or close while the analog switches SW2 and SW4 are controlled by a clock pulse signal CKB so as to be made open or close. The analog switches SW2 and SW3 are turned on when the clock pulse signals CKA, CKB are high while the analog switches SW2 and SW3 are turned off when the clock pulse signals CKA, CKB are low. These signals CKA, CKB have a repetition rate of a same period, for example, of two horizontal periods 2H (1H is a horizontal scanning period) and a phase difference of 180 degrees so that they do not become high at the same time.

Meanwhile, the output line 12 of the liquid-crystal driving voltage V2 is connected to a output line 16 through a second switched capacitor circuit 14. The second switched capacitor circuit 14 comprises analog switches SW5, SW6, SW7 and SW8, and capacitors Cc and Cd. A series connection of the analog switches SW5, SW6, SW7 and SW8 is connected between the output line 12 and the output line 16 and a junction point of the analog switches SW6 and SW7 is grounded. A capacitor Cc is connected to a series connection of the analog switches SW6 and SW7 in parallel and a capacitor Cd is connected between the output line 16 and the earth. The analog switches SW5 and SW7 are controlled by a clock pulse signal CKC so as to be made open or close while the analog switches SW6 and SW8 are controlled by a clock pulse signal CKD so as to be made open or close. The analog switches SW5 and SW6 are turned on when the clock pulse signals CKC, CKD are high while the analog switches SW5 and SW6 are turned off when the clock pulse signals CKC, CKD are low. These signals CKC, CKD have a repetition rate of two horizontal periods 2H and a phase difference of 180 degrees so that they do not become high at the same time.

Figure 5:
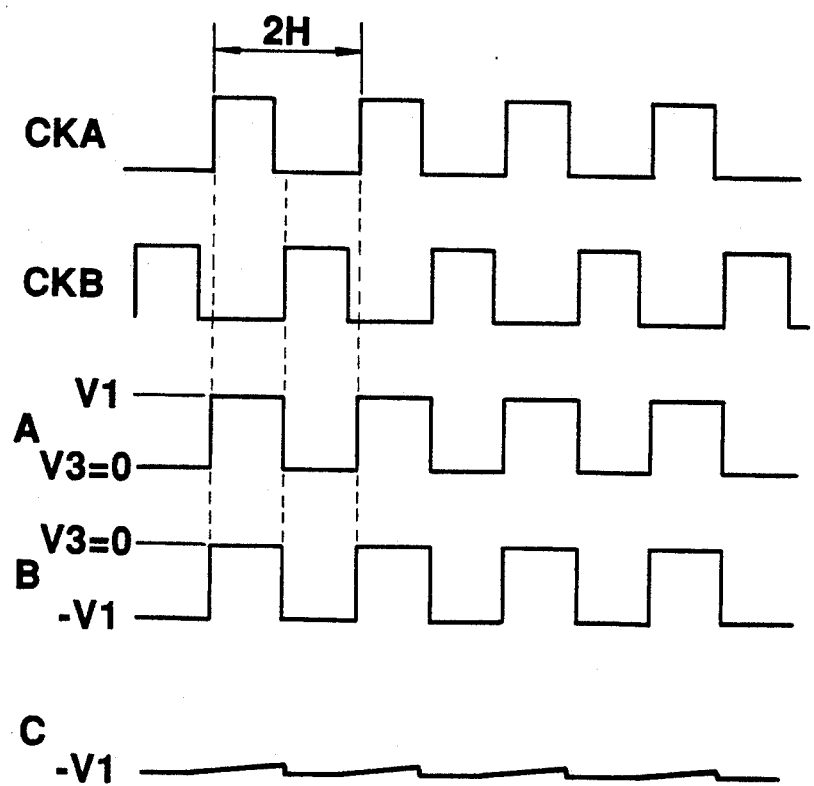
FIG. 5 is a timing chart for the operation performed by the voltage generating circuit of FIG. 4.

Now, operation of the voltage generating circuit shown in FIG. 4 will be described with reference to FIG. 5. The power source voltage E is divided by the variable resistor R1 and the resistor R2 and the divided voltage is applied to the differential amplifier A1 as a reference voltage. The reference voltage can be adjusted by the variable resistor R1 without any limitation. The differential amplifier A1 amplifies the reference voltage with a voltage gain determined based on the the values of the resistors Ra and Rb, and outputs its amplified voltage as the liquid-crystal driving voltage V1 in the same polarity as the reference voltage to the output line 11. The liquid-crystal driving voltage V1 is divided by the resistors R3 and R4, and the divided voltage is applied to the differential amplifier A2. The differential amplifier A2 outputs the liquid-crystal driving voltage V2 in the same polarity as the applied voltage to the output line 12.

Meanwhile, the first switched capacitor circuit 13 is controlled by the clock pulse signals CKA and CKB, generating the liquid-crystal driving voltage V5. More specifically, while the clock pulse signal CKA is at a high level and the clock pulse signal CKB is at a low level, the analog switches SW1 and SW3 are turned on and the analog switches SW2 and SW4 are turned off. As a result, the terminals A and B of the capacitor Ca are connected to the output line 11 and the earth, respectively, and thereby the capacitor Ca is charged towards the liquid-crystal driving voltage V1.

While the clock pulse signal CKA is at a low level and the clock pulse signal CKB is at a high level, the analog switches SW1 and SW3 are turned off and the analog switches SW2 and SW4 are turned on. As a result, the terminal A of the capacitor Ca is connected to the earth and the terminal B is connected to the output line 15, and thereby the terminal B of the capacitor Ca is brought to a potential −V1 and then the capacitor Cb is charged towards the voltage −V1 at C point.

While the clock pulse signal CKB is at a low level, the analog switch SW4 is turned off. Therefore, the potential −V1 charged in the capacitor Cb is supplied to a load as the liquid-crystal driving voltage V5.

Thereafter, similar operations are repeated and the liquid-crystal driving voltage V5 is maintained at the same level as the liquid-crystal driving voltage V1 with respect to the earth potential (=V3) but in the opposite polarity to the voltage V1. In this case, since the capacitor Cb is discharged through a load while the analog switch SW4 is turned off, the level of the liquid crystal voltage V5 varies but the variation in its voltage level is small enough, having no effect to luminance of the liquid crystal display panel.

The second switched capacitor circuit 14 is also controlled by the clock pulse signals CKC and CKD, generating the liquid-crystal voltage V4 in a similar operation to that of the first switched capacitor circuit 13. The liquid-crystal driving voltage V5 is maintained at the same level as the liquid-crystal driving voltage V2 with respect to the earth potential (=V3) but in the opposite polarity to that of the driving voltage V2.

In FIG. 4, the operations of the differential amplifiers A1 and A2, to which the positive power source E+, are described but similarly, the liquid-crystal driving voltages V1 through V5 are available, using a negative power source.

In the embodiment described above, the liquid-crystal driving voltages V1 through V5 are obtained, using one of the positive power source and the negative power source and an employment of the switched capacitor circuits 13 and 14 for generating the liquid-crystal driving voltages V5 and V4 allows a simple circuit configuration with less number of the amplifiers. In case that the repetition period of the clock pulse signals CKA, CKB, CKC and CKD is set to 2H (two horizontal scanning periods), the charging period and discharging period of the capacitors Cb and Cd of the switched capacitor circuits 13 and 14 are alternatively switched every horizontal scanning period. As a result, any ripple produced on the liquid-crystal driving voltages V5 and V4 has no effect on a display image.

Now, circuit configurations of the scanning electrode driving circuit 20 and the signal electrode driving circuit 80 involving the above switched capacitor circuits 13, 14 will be described.

Figure 6:
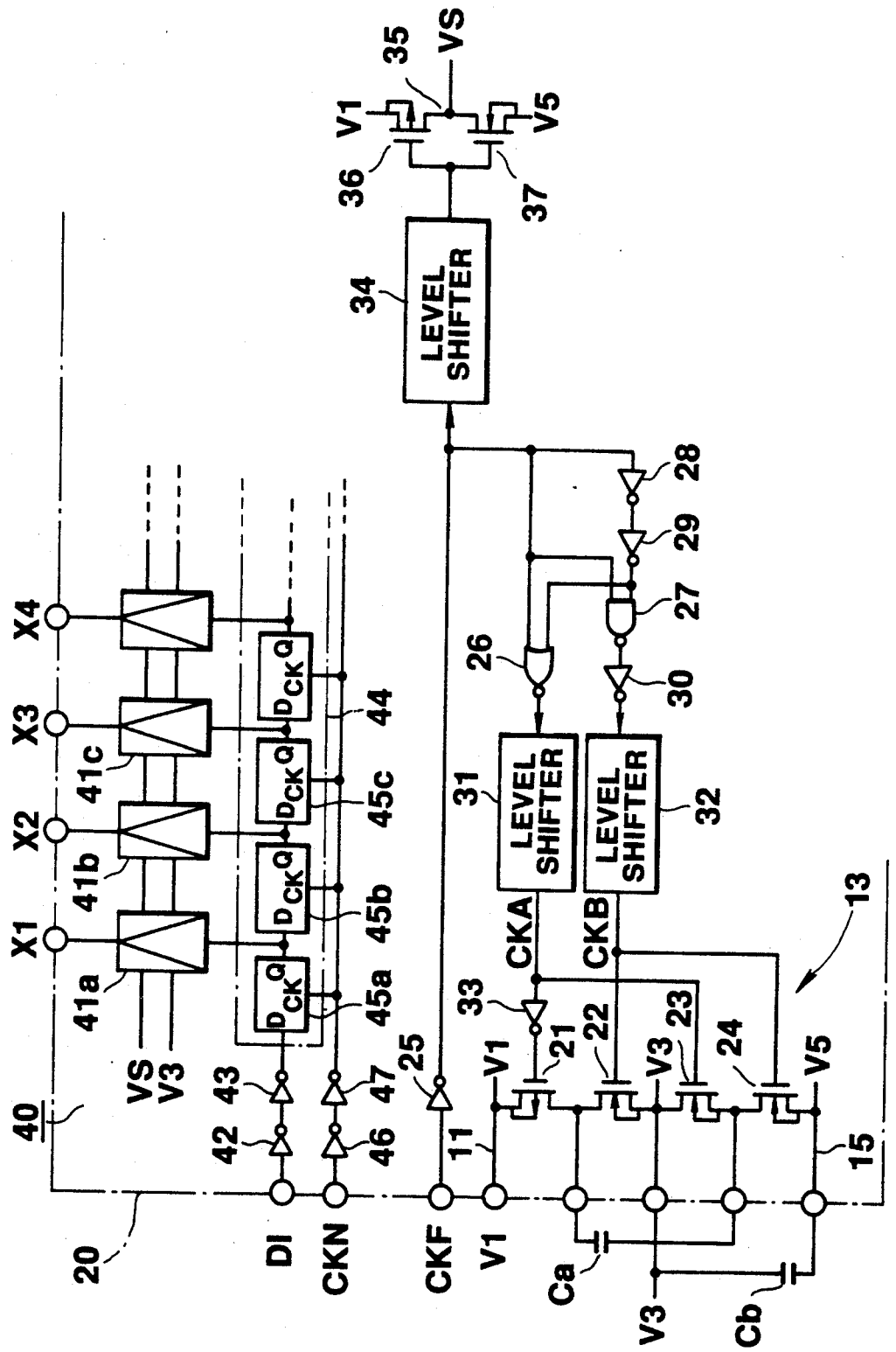
FIG. 6 is a block diagram showing a construction of a scanning electrode driving circuit of FIG. 3 involving a first switched capacitor circuit of FIG. 4.

FIG. 6 is a view showing an integrated circuit of the scanning electrode driving circuit 20 involving the first switched capacitor circuit 13.

The first switched capacitor circuit 13 is composed of a series connection of MOS field-effect transistors 21 through 14, which serve as the analog switches SW1 through SW4, respectively. In this case, the transistor 21 uses an N-channel type device while the transistors 22 to 24 use a P-channel type devices. The liquid-crystal driving voltage V1 delivered through the line 11 from the differential amplifier A1 of FIG. 4 is supplied to a drain electrode of the transistor 21, thereby connecting a source electrode of the transistor 24 to the line 15. The external capacitor Ca is connected between a drain electrode of the transistor 22 and a source electrode of the transistor 23 while the external capacitor Cb is connected between a drain electrode of the transistor 23 and a source electrode of the transistor 24.

To AC drive the liquid crystal display panel 100, an AC signal CKF is supplied to NOR circuit 26 and NAND circuit 27 through an inverter 25. The AC signal CKF has a period of two horizontal scanning period. The output signal of the inverter 25 is supplied to NOR circuit 26 and NAND circuit 27 through the inverters 28 and 29. The output signal of NOR circuit 26 is supplied to a level shifter circuit 31 to obtain a clock pulse signal CKA. The clock pulse signal CKA is supplied to a gate electrode of the transistor 23 and simultaneously supplied to a gate electrode of the transistor 21 through an inverter 33. The output signal of NAND circuit 27 is supplied to a level shifter circuit 32 through an inverter 30 to obtain a clock pulse signal CKB. The clock pulse signal CKB is applied to gate electrodes of transistors 22 and 24.

The output signal of the above inverter 25 is supplied to a voltage selecting circuit 35 through a level shifter circuit 34. The voltage selecting circuit 35 is composed of a P-channel MOS field effect transistor 36 and an N-channel MOS field effect transistor 37 and it receives the output signal of the level shifter circuit 34 at their gates electrodes. The liquid crystal driving voltage V1 is applied to a drain electrode of the transistor 36 while the liquid crystal driving voltage V5 is applied to a drain electrode of the transistor 37. Then, a selection voltage VS appears at source electrodes of the transistors 36 and 37. In the voltage selecting circuit 35, transistor 36 is ON and the transistor 37 is OFF, when the output signal of the level shifter 34 is low. Then, the selection voltage VS becomes V1. When the output signal of the level shifter 34 is high, the transistor 36 is OFF and the transistor 37 is ON. Then, the selection voltage VS becomes V5. In this manner, the voltage selecting circuit 35 outputs the voltage V1 or V5 as the selection voltage VS depending on the level of the AC signal CKF.

The selection voltage VS of the voltage selecting circuit 35 is supplied to output buffers 41a, 41b, ... involved in the scanning electrode driving circuit 40 and further, the voltage V3 is applied to these output buffers 41a, 41b, ....

The scanning electrode driving circuit 40 is supplied with a scanning start signal DI. The scanning start signal DI is transferred to the shift register 44 through the inverters 42 and 43. The shift register 44 is composed of a series connection of flip flop circuits 45a, 45b, ... of a D-type and it is supplied with a clock pulse signal CKN for deciding the scanning timing at its clock terminal CK through the inverters 46 and 47. The shift register 44 reads in the scanning start signal DI and is successively shifted in response to the clock pulse signal CKN and outputs the scanning start signal DI to the output buffers 41a, 41b .... The output buffer 41a, 41b, ... output the selection signal VS when the received signals are high, while they output the voltage V3 when the received signal is low. The output signals of the output buffers 41a, 41b, ... are supplied as the scanning electrode signals to the scanning electrodes X1, X2, ... of the liquid crystal display panel 100.

Figure 7:
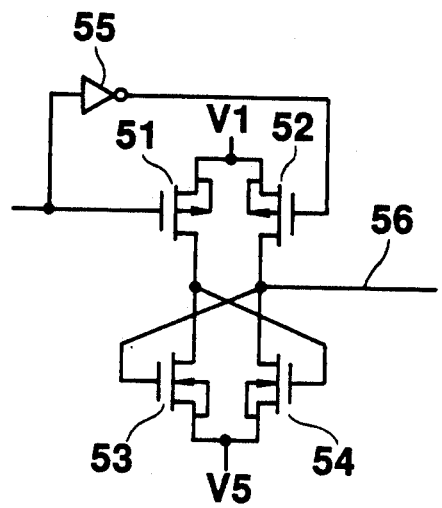
FIG. 7 is a view showing in detail a level shifter circuit shown in FIG. 6.
Figure 8:
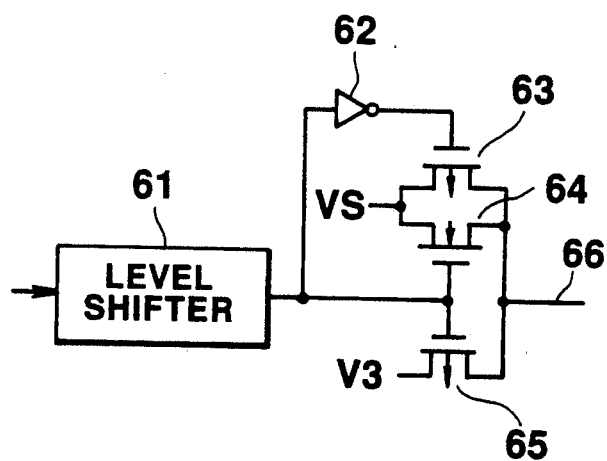
FIG. 8 is a view showing in detail an output buffer circuit of FIG. 6.

The above level shifter circuits 31, 32, 34 are constructed as shown in FIG. 7 and the output buffers 41a, 41b, ... are constructed as shown in FIG. 8.

The level shifters 31, 32 and 34 shown in FIG. 7 each comprise P-channel MOS field effect transistors 51, 52 and N-channel MOS field effect transistors 53, 54 and an inverter 55. The transistors 51, 53 are connected in series and also the transistors 52, 54 are connected in series. The voltage V1 is applied to the drain electrodes of the transistors 51, 52 and the voltage V5 is applied to the drain electrodes of the transistors 53, 54. An input signal is applied directly to the gate electrode of the transistor 51 and is applied through the inverter 55 to the gate electrode of the transistor 52. Furthermore, the source electrode of respective transistors 51, 53 is connected to the gate electrode of the transistor 54 while the source electrode of respective transistors 52, 54 is connected to both the gate electrode of the transistor 53 and an output line 56.

In the level shifter circuit constructed as mentioned above, the transistors 51, 52 are controlled to be made ON or OFF by the input signal and the transistors 53, 54 are controlled to be made ON or OFF in response to the ON state or OFF state of the above transistors 51, 52 and wherein the voltage V1 or the voltage V5 appears at the output line 56.

As shown in FIG. 8, the output buffers 41a, 41b, ... each comprise the level shifter 61, inverter 62, P-channel MOS field effect transistors 63, 65 and N-channel MOS field effect transistor 64. The input signal is applied to the gate electrodes of the transistors 64, 65 through the level shifter circuit 61 and is also applied from the level shifter circuit 61 to the gate electrode of the transistor 63 through the inverter 62. The selection voltage VS is applied the drain electrodes of the transistors 63, 64 and the voltage V3 is supplied to the drain electrode of the transistor 65. The source electrode of respective transistors 63, 64 and 65 is connected to the output line 66, where the selection voltage VS or the voltage V3 appears.

More specifically, when the level shifter circuit 61 outputs a signal of a high level, one of the transistors 63, 64 is turned on and the transistor 65 is turned off in accordance with the level of the selection voltage VS, thereby the selection voltage VS appears at the output line 66. When the level shifter circuit 61 outputs a signal of a low level, the transistors 63, 64 is turned off and the transistor 65 is turned on, and thereby the voltage V3 appears at the output line 66.

Figure 9:
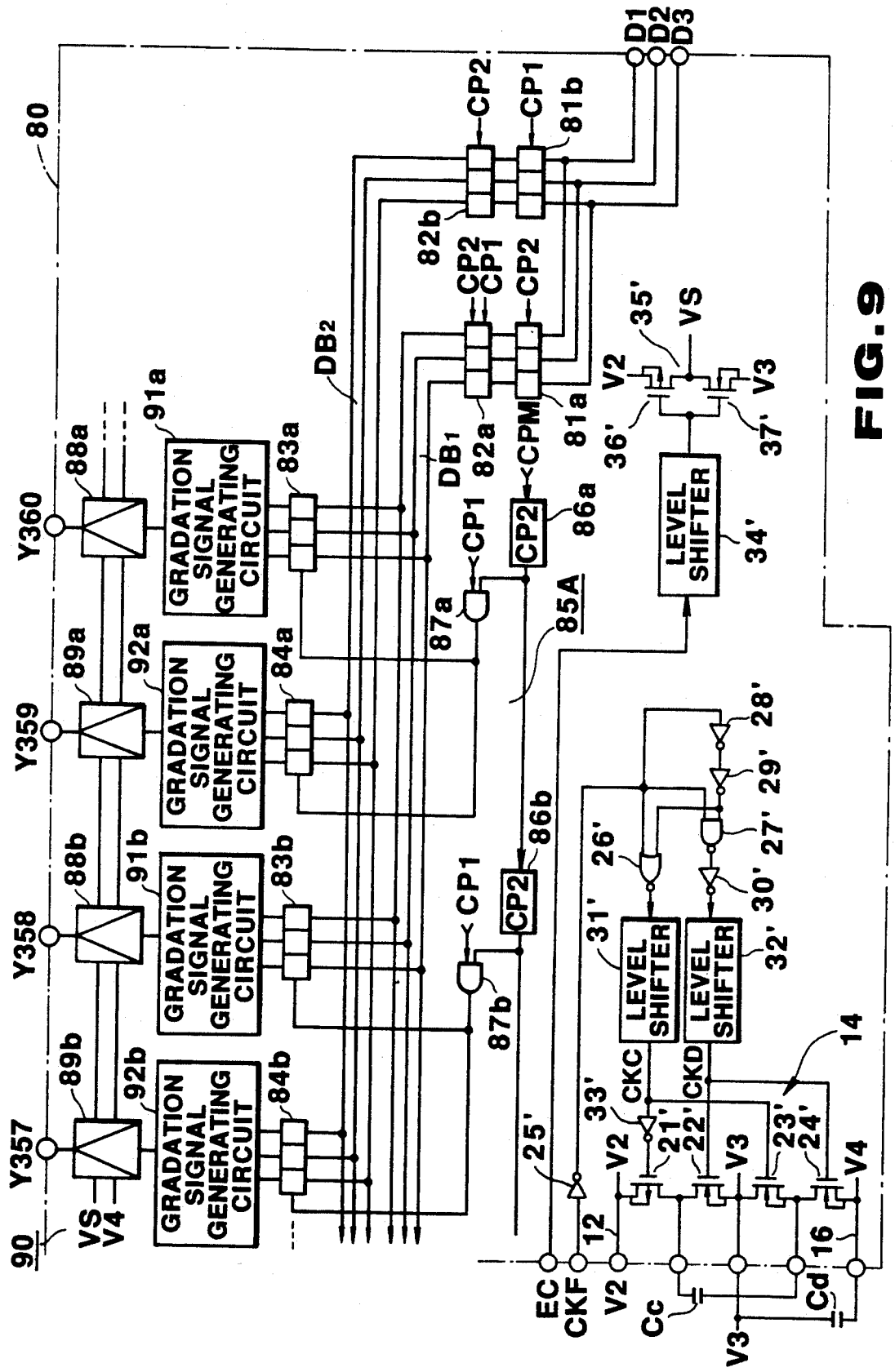
FIG. 9 is a block diagram showing a signal electrode driving circuit of FIG. 3 involving a second switched capacitor circuit of FIG. 4.

FIG. 9 is a view showing an example of an integrated circuit of the signal electrode driving circuit 80 involving the second switched capacitor circuit 14.

The second switched capacitor circuit 14 is composed of a series connection of MOS field effect transistors 21' through 24', which serves as the analog switches SW5 through SW8, respectively, where the transistor 21' uses a transistor of a P-channel type and the transistors 22' to 24' use a transistors of an N-channel type. The liquid crystal driving voltage V2 which is delivered through the line 12 from the differential amplifier A2 is supplied to the drain electrode of the transistor 21'. The source electrode of the transistor 24' is connected to the line 16. An external capacitor Cc is connected between the drain electrode of the transistor 22' and the source electrode of the transistor 23' while an external capacitor Cd is connected between the drain electrode of the transistor 23' and the source electrode of the transistor 24'.

AC signal CKF for AC driving the liquid crystal display panel 100 is supplied to NOR circuit 26' and NAND circuit 27' through the inverter 25' and the output of the inverter 25' is further supplied to NOR circuit 26' and NAND circuit 27' through inverters 28', 29'. The output signal of NOR circuit 26' is supplied as a clock pulse signal CKC to the gate electrode of the transistor 23' through the level shifter circuit 31' and is also supplied to the gate electrode of the transistor 21' through an inverter 33'. The output signal of NAND circuit 27' is supplied as a clock pulse signal CKD to the gate electrodes of the transistors 22', 24' through an inverter 30' and a level shifter circuit 32'.

A no bias voltage EC to be applied to the liquid crystal display panel 100 to bring it no-biased during the blanking period of the display signal is supplied to a voltage selecting circuit 35' through a level shifter circuit 34'. The voltage selecting circuit 35' is composed of a P-channel MOS field effect transistor 36' and an N-channel MOS field effect transistor 37'. The output signal of the level shifter circuit 34' is supplied to the gate electrodes of the transistors 36', 37'. The liquid crystal driving voltage V2 is supplied to the drain electrode of the transistor 36' while the liquid crystal driving voltage V3 is supplied to the drain electrode of the transistor 37' and wherein the selection voltage VS appears at the source electrodes of the transistors 36', 37'. In the voltage selecting circuit 35', when the output signal of the level shifter circuit 34' is at a low level, the transistor 36' is turned on and the transistor 37' is turned off, wherein the voltage V2 is output as the selection voltage VS. When the output signal of the level shifter circuit 34' is at a high level, the transistor 36' is turned off and the transistor 37' is turned on, wherein the voltage V3 is output as the selection voltage VS. That is, the voltage selection circuit 35' outputs the voltage V2 or V3 as the selection voltage VS in accordance with the level of the no bias voltage EC.

The selection voltage VS output from the voltage selecting circuit 35' is supplied to output buffers 88a, 89a, 88b, 89b, ... of a signal electrode driving circuit 90. In addition, the voltage V4 is supplied to these output buffers 88a, 89a, 88b, 89b, ....

In the signal electrode driving circuit 90, display data D1 to D3 of 3 bits are delivered to buffer circuits 81a, 81b of 3 bits from a preceding stage circuit, A/D converter circuit 120. The buffer circuit 81a reads the delivered data D1 to D3 in synchronism with a clock pulse signal CP2 supplied from the timing signal generating circuit 140 while the buffer circuit 81b reads the delivered data D1 to D3 in synchronism with a clock pulse signal CP1. Date held in the buffer circuits 81a, 81b are delivered to buffer circuits 82a, 82b, respectively. The buffer circuit 82a reads the data in synchronism with the clock pulse signal CP1 and outputs the data in synchronism with the clock pulse signal CP2 while the buffer circuit 82b reads and outputs the data in synchronism with the clock pulse signal CP2. The data held in the buffer circuit 82a are delivered to latch circuits 83a, 83b, ... through data bus lines DB1 while the data held in the buffer circuit 82b are delivered to latch circuits 84a, 84b, ... through data bus lines DB2. The latch circuits 83a, 83b, ... 84a, 84b, ... are supplied with a latch clock signal from a latch clock signal generating circuit 85A. The latch clock signal generating circuit 85A is composed of flip-flop circuits 86a, 86b of a edge triggered type and AND circuits 87a, 87b, ... The flip-flop circuits 86a, 86b, ... operate in synchronism with the clock pulse signal CP2 and function as a shift register circuit. The flip-flop circuits 86a, 86b, ... successively shift a latch timing signal CPM delivered from the timing signal generating circuit 140, in synchronism with the clock pulse signal CP2. The output signals of the flip-flop circuits 86a, 86b, ... are supplied to AND circuits 87a, 87b, ..., respectively. AND circuits 87a, 87b, ... are supplied with the clock pulse signal CP1 and the output signals of AND circuits 87a, 87b, ... are supplied to latch circuits 83a, 83b, ... and 84a, 84b, ... as a latch lock signal. The latch circuits 83a, 83b, ... and 84a, 84b, ... latch the delivered data D1 to D3 in synchronism with the latch lock signal supplied from the latch clock generating circuit 85A and output the data to gradation signal generating circuits 91a, 91b, ... 92a, 92b, .... The gradation signal generating circuits 91a, 91b, ... 92a, 92b, ... hold the delivered data D1 to D3 for one scanning line and produce a pulse width signal, i.e., a gradation signal of 3-bit 8-gradations in accordance with the held data and then supply them to the output buffer circuits 88a, 88b, ... 89a, 89b, .... The output buffer circuits 88a, 88b, ... 89a, 89b, ... output the selection voltage VS or the voltage V4 in accordance with the gradation signal delivered from the gradation signal generating circuits 91a, 91b, ... 92a, 92b, .... The signals output from the output buffer circuits 88a, 88b are delivered as signal electrode driving signals to signal electrodes Y360, Y359, ... of the liquid crystal display panel 100.

Figure 10:
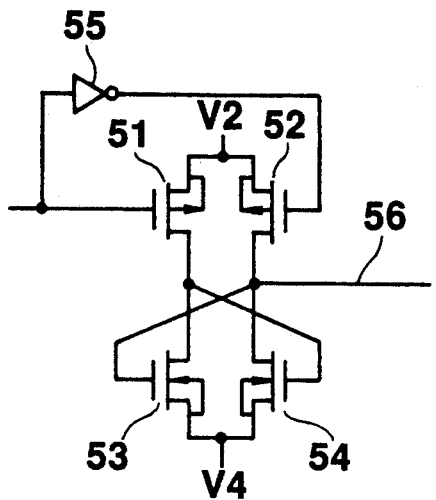
FIG. 10 is a detailed circuit diagram of a level shifter circuit of FIG. 9.
Figure 11:
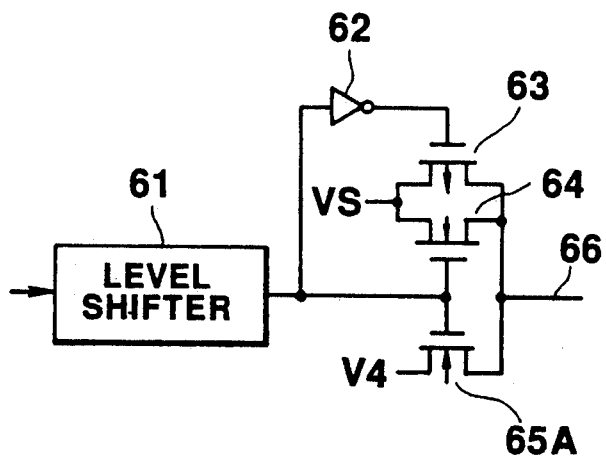
FIG. 11 is a detailed circuit diagram of an output buffer circuit of FIG. 9.

A configuration of the level shifter circuits 31, 32, 34 and that of the outputmbuffer circuits 88a, 88b, ... 89a, 89b, ... are shown in FIGS. 10 and 11, respectively.

The level shifter circuits 31, 32, 34 shown in FIG. 10 each are composed of P-channel MOS field effect transistors 51, 52, N-channel MOS field effect transistors 53, 54 and an inverter 55. The transistors 51, 53 and the transistors 52, 54 are connected in series and the voltage V2 is applied to the drain electrodes of the transistors 51, 52 and the voltage V4 is applied to the drain electrodes of the transistors 53, 54. An input signal is directly applied to the gate electrode of the transistor 51 and is applied to the gate electrode of the transistor 52 through the inverter 55. The source electrodes of the transistors 51, 53 are connected to the gate electrode of the transistor 54 while the source electrodes of the transistors 52, 54 are connected to both the gate electrode of the transistor 53 and the output line 56.

In the above described level shifter circuit, the transistors 51, 52 are controlled to be made ON or OFF by the input signal while the transistors 53, 54 are controlled to be ON or OFF in accordance with ON/OFF operation of the above transistors 51, 52, wherein the voltage V2 or V4 appears at the output line 56.

The output buffer circuits 88a, 88b, ... 89a, 89b, ... shown in FIG. 11 are composed of a level shifter circuit 61, an inverter 62, P-channel MOS field effect transistor 63 and N-channel MOS field effect transistors 64, 65. An input signal is applied to the gate electrodes of the transistors 64, 65 through the level shifter circuit and is applied to the gate electrode of the transistor 63 through the level shifter circuit 61 and the inverter 62. The selection voltage VS is applied to the drain electrodes of the transistors 63, 64 while the voltage V4 is applied to the drain electrode of the transistor 65. All the source electrodes of the transistors 63, 64, 65 are connected to the output line 66, where the selection voltage VS or the voltage V4 appear.

When the level shifter circuit 61 outputs a signal of a high level, one of the transistors 63, 64 is turned on in accordance with the level of the selection voltage VS and the transistor 65 is turned off, wherein the selection voltage VS appears at the output line 66. When the level shifter circuit 61 outputs a signal of a low level, both the transistors 63, 64 is turned off and the transistor 65 is turned on, wherein the voltage V4 appears at the output line 66.

Figure 12:
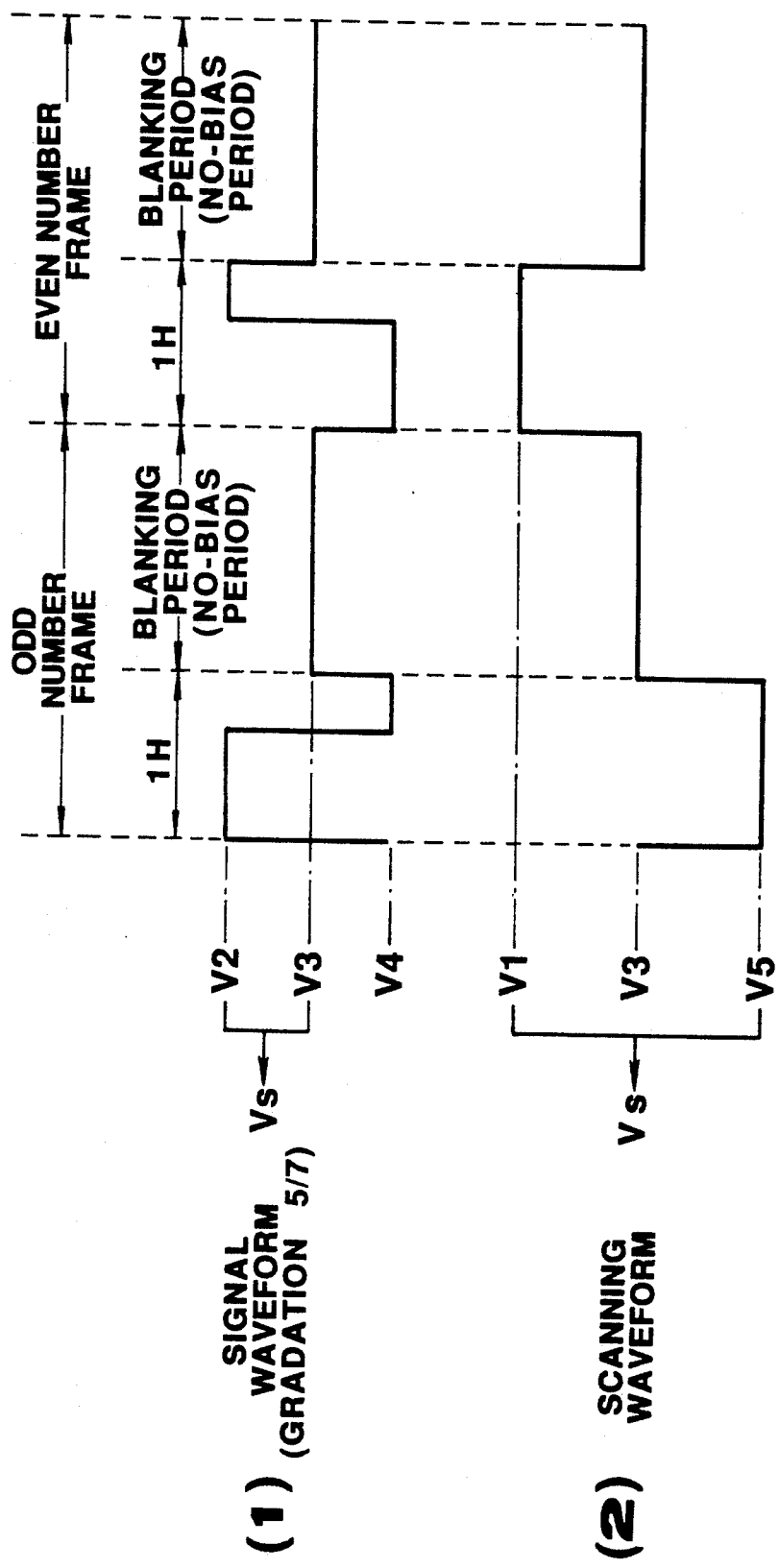
FIG. 12 is a view showing wave forms of outputs of an output buffer circuits of FIGS. 6 and 9.

A waveform (for one horizontal scanning period) of the signal electrode driving voltage is shown at (1) in FIG. 12, which is output from the output buffer circuits 88a, 88b, ... 89a, 89b, ... involved in the the signal electrode driving circuit 90 and a waveform (for one horizontal scanning period) of the scanning electrode driving voltage is shown at (2) in FIG. 12, which is output from the output buffer circuits 41a, 41b, ... involved in the scanning electrode driving circuit 40.

In case that, for example, "1 0 1" are the data D1 to D3 of 3 bits which are supplied from the the latch circuits 83a, 83b, ... 84a, 84b, ... to the gradation signal generating circuits 91a, 91b, ... 92a, 92b, ... and a gradation signal of a pulse width "5/7" is supplied from the gradation signal generating circuits 91a, 91b, ... 92a, 92b, ... to the output buffer circuits 88a, 88b, ... 89a, 89b, ..., the output buffer circuits 88a, 88b, ... 89a, 89b, ... output a signal having the waveform as shown at (1) in FIG. 12.

More specifically, for a period of an odd number frame, the signal electrode driving voltage (selection voltage VS) is V2 for a period of 5/7 of a horizontal scanning period and is V4 for a period of 2/7 of a horizontal scanning period, and the signal electrode driving voltage (selection voltage VS) is V3 for a blanking period or a no bias period. For a period of an even number frame, the driving voltage (selection voltage VS) is V4 for a period of 5/7 of a horizontal scanning period and is V2 for a period of 2/7 of a horizontal scanning period, and the signal electrode driving voltage (selection voltage VS) is V3 for a blanking period or a no bias period.

In the meantime, in the scanning electrode driving circuit 40, the output buffer circuits 41a, 41b, ... outputs the selection voltage VS while they receive a high level signal from the shift register circuit 44 and the output buffer circuits 41a, 41b, ... outputs the voltage V3 while they receive a low level signal from the shift register circuit 44. More specifically, as shown at (2) in FIG. 12, for a period of an odd number frame, the scanning electrode driving voltage (selection voltage VS) is V5 for one horizontal scanning period and is V3 for a blanking period or a no bias period. For a period of an even number frame, the scanning electrode driving voltage (selection voltage VS) is V1 for a horizontal scanning period and is V3 for a blanking period.

As described above, an integration of a combination of the first switched capacitor circuit 13, the second switched capacitor circuit 14 and the liquid crystal driving circuit allows the circuit block to be made compact in size.

What is claimed is:

1. A liquid crystal display apparatus comprising:
   video signal supplying means for supplying a video signal;
   liquid crystal display panel means having signal electrodes and scanning electrodes, for displaying an image;

signal electrode driving circuit means for driving the signal electrodes of said liquid crystal display panel means based on the video signal supplied from said video signal supplying means, wherein said signal electrode driving circuit means is externally supplied with a single first signal voltage and includes a switched capacitor circuit means for generating a second liquid crystal driving voltage by turning over the first signal voltage with respect to a medium voltage, and wherein said switched capacitor circuit means includes a first chargeable capacitor and a second capacitor for a maintaining a charge of said first capacitor purpose, both said first and second capacitors being arranged outside said signal electrode driving circuit means, and said switched capacitor circuit means further including switching circuit means and switching signal generating means which are arranged within said signal electrode driving circuit means; and scanning electrode driving circuit means for driving the scanning electrodes of said liquid crystal display panel means.

2. A liquid crystal display apparatus according to claim 1, wherein said switching signal generating means operates a two phase clock signal, said two phase clock signal including a clock signal for charging said first capacitor, and a clock signal for transferring electric charge in said first capacitor to said second capacitor.

3. A liquid crystal display apparatus according to claim 2, wherein said two phase clock signal is in synchronism with a timing for horizontal scanning of said liquid crystal display panel means.

4. A liquid crystal display television receiver according to claim 1, wherein said medium voltage is equivalent to ground potential.

5. A liquid crystal display apparatus comprising:
video signal supplying means for supplying a video signal;

liquid crystal display panel means having signal electrodes and scanning electrodes, for displaying an image;

signal electrode driving circuit means for driving the signal electrodes of said liquid crystal display panel means based on the video signal supplied from said video signal supplying means; and scanning electrode driving circuit means for driving the scanning electrodes of said liquid crystal display panel means, wherein said scanning electrode driving circuit means is externally supplied with a single first signal voltage and includes a switched capacitor circuit means for generating a second liquid crystal driving voltage by turning over the first signal voltage with respect to a medium voltage, and wherein said switched capacitor circuit means includes a first chargeable capacitor and a second capacitor for maintaining a charge on said first capacitor, both of said first and second capacitors being arranged outside said scanning electrode driving circuit means, and said switched capacitor circuit means further including switching circuit means and switching signal generating means which are arranged within said scanning electrode driving circuit means.

6. A liquid crystal display apparatus according to claim 5, wherein said switching signal generating means operates a two phase clock signal, said two phase clock signal including a clock signal for charging said first capacitor, and a clock signal for transferring electric charge in said first capacitor to said second capacitor.

7. A liquid crystal display apparatus according to claim 6, wherein said two phase clock signal is in synchronism with a timing for horizontal scanning of said liquid crystal display panel means.

8. A liquid crystal display apparatus receiver according to claim 5, wherein said medium voltage is equivalent to ground potential.

* * * * *